United States Patent [19]

Patterson

[11] 4,196,618
[45] Apr. 8, 1980

[54] SPECIFIC VOLUME DETERMINING METHOD AND APPARATUS

[76] Inventor: James A. Patterson, 1295 S. Springer Rd., Los Altos, Calif. 94022

[21] Appl. No.: 959,677
[22] Filed: Nov. 13, 1978
[51] Int. Cl.² ............................................. G01F 17/00
[52] U.S. Cl. .................................... 73/149; 73/437
[58] Field of Search ............... 73/149, 32 R, 437, 433

[56] References Cited

U.S. PATENT DOCUMENTS

| | | | |
|---|---|---|---|
| 499,576 | 6/1893 | Pease | 73/149 UX |
| 1,901,687 | 3/1933 | Zook | 73/149 X |
| 2,296,852 | 9/1942 | Horner | 73/149 X |
| 2,667,782 | 2/1954 | Shea | 73/149 |
| 2,706,908 | 4/1955 | MacRoberts | 73/149 |
| 3,060,724 | 10/1962 | Smith, Jr. et al. | 73/149 X |
| 3,113,448 | 12/1963 | Hardway, Jr. et al. | 73/149 |
| 3,129,585 | 4/1964 | Hamilton | 73/149 |
| 3,377,839 | 4/1968 | Haas | 73/149 X |
| 3,487,682 | 1/1970 | Whitehead, Jr. | 73/149 |
| 4,123,936 | 11/1978 | Peak | 73/149 |

Primary Examiner—John Petrakes
Attorney, Agent, or Firm—Limbach, Limbach & Sutton

[57] ABSTRACT

A specific volume determining method and apparatus is disclosed having a piston sealably engaged in a container cylinder with a precision bore sight tube sealably mounted on the piston. Fluid is filled in the closed assembly to a predetermined level on a scale with the sight tube. The piston is withdrawn from the cylinder and the article to be measured inserted on a spring biased basket lifted up out of the fluid. The piston is replaced in the cylinder and locked tight, and the assembly vibrated to establish a new measuring level in the sight tube. Readings are taken in the sight tube with a miniature cross-linked polystyrene sphere floating on the surface of a liquid having a density between approximately 1.05 and 1.18 grams per cubic centimeter and containing a surface active agent and an anti-vaporization agent.

10 Claims, 6 Drawing Figures

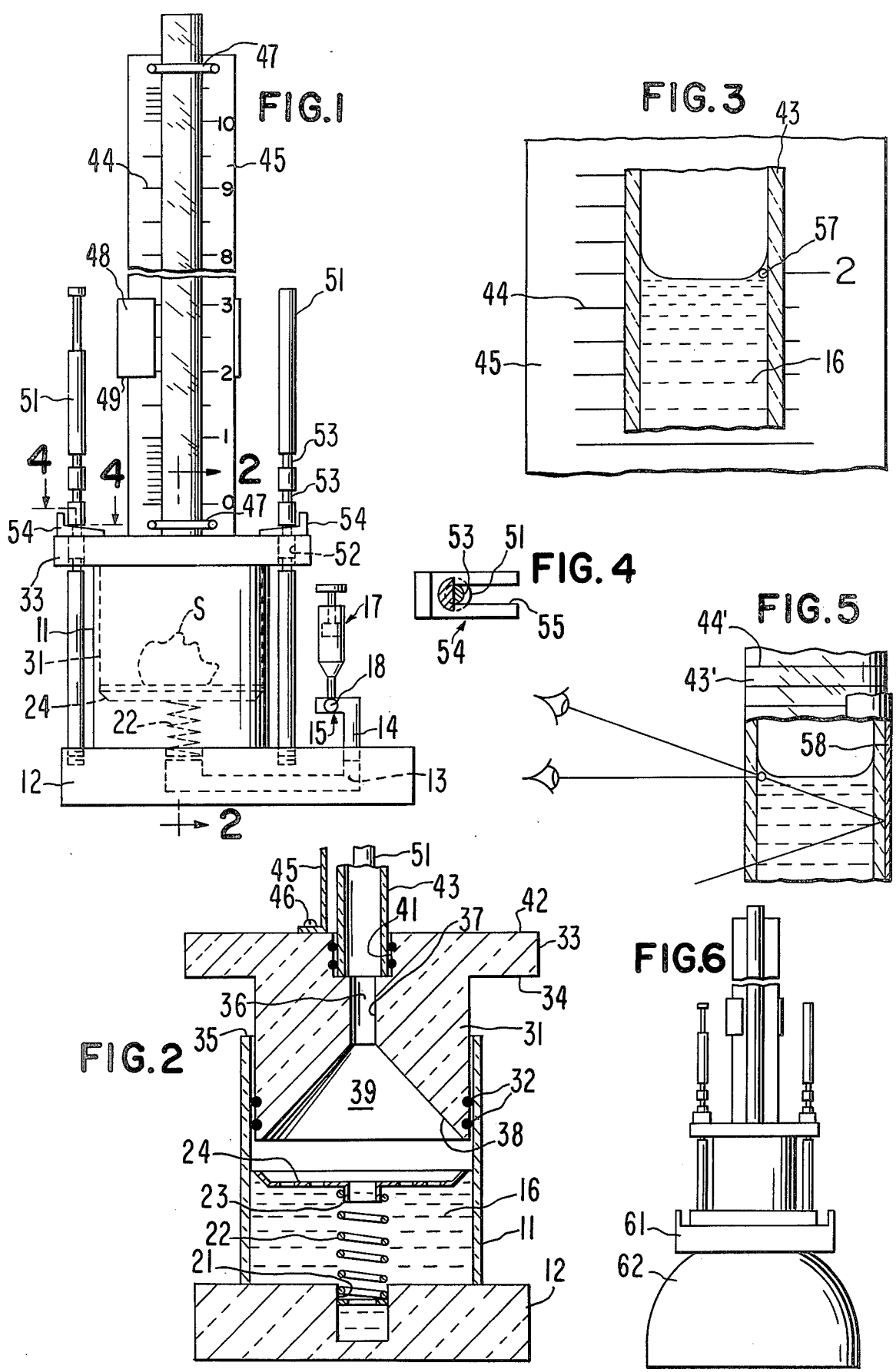

SPECIFIC VOLUME DETERMINING METHOD AND APPARATUS

BACKGROUND OF INVENTION

This invention relates in general to method and apparatus for determining specific volume and more particularly to method and apparatus for precisely determining volume of miniature articles such as gem stones and precious metals.

It is often desirable to determine the exact volume of an irregular shaped object with a very high accuracy. One particular application is for determining the volume of gem stones or precious metal objects such as gold to use in conjunction with a precise weighing of the object to determine the density or specific gravity. The precise determination of the specific gravity can serve as one identification of the particular article and also can serve to aid in determination of the material making up the article. For example, if a yellow metal object has a density of 19.3 g/cm$^3$, it can be established as gold. Where the article has a slightly different color due to a minor portion of silver or copper, the determination of the specific gravity will indicate the percentage of gold versus the other metal.

One conventional technique for measuring the volume of an irregularly shaped precious metal is to melt the material in a graduated container. This is not only difficult to do from the standpoint of the heat required, but is also destructive of the shape of the article. Another technique used for determining the volume of an irregularly shaped object is to weigh the object in air and weigh the object in water. Since the object in water is buoyed up by a force equal to the amount of displaced liquid, the difference in the two weight measurements divided by the specific gravity of water should give a determination of the volume of the object. This method suffers from the inaccuracies in determining the weight of the object in water. Still another technique for determining specific gravity is to have a multitude of jars of fluids of different known specific gravities. The sample is then placed in different jars seeking to find the fluid in which the sample is most nearly uniformly suspended. This is a tedious process which may not produce an accurate result and the fluids in the jars are easily contaminated resulting in changes in the specific gravity thereof and therefore that of the sample.

U.S. Pat. Nos. 2,296,852 and 3,129,585 disclose devices for determining the volume of substances, typically soil samples utilizing the displacement of a liquid as a measurement of the volume of the substance. In U.S. Pat. No. 2,296,852 the apparatus includes an accurate screw drive mechanism for the reciprocating plunger in a plunger chamber which moves liquid into and out of the sampling chamber. By advancing the plunger to fill the sampling chamber first without a sample and then with a sample the difference in the position of the plunger will record the volume of the sample. In U.S. Pat. No. 3,129,585 pressurization of a piston onto a quantity of liquid before and after insertion of a sample into the liquid results in a difference in the position of a piston rod connected to the piston which then serves as a measure of the volume of the sample. In U.S. Pat. No. 2,667,782 the pressure drop from an inner pressurized chamber which contains the sample into an outer unpressurized chamber is used to indicate the volume of the sample, whereas in U.S. Pat. No. 3,113,448 a change in the volume of a reference system by a fixed amount is compared with the change in volume in a second gaseous system containing the sample to maintain the specific volume of the gas in the second system equal to that of the first system to determine the volume of the sample. In U.S. Pat. No. 3,487,682 a flexible member forming an integral wall of a fluid chamber is moved under pressure to compress a deformable material so that the deformable material is measured in terms of the volume of liquid applied to the flexible member.

It is the object of the present invention to provide a simple and inexpensive yet highly accurate and easy to operate device and method for measuring the volume of samples.

Broadly stated, the present invention, to be described in greater detail below, is directed to apparatus and the method of its use wherein a piston slidably sealed within a container cylinder is provided with an accurately graduated bore sight tube on top of the piston so that fluid displaced from the container cylinder through a bore in the piston into the sight tube indicates the volume of the sample inserted into the cylinder.

One feature and advantage of the present invention is that the sight tube is provided with graduations which are the precise cubic centimeter volume graduations in the sight tube whereby the volume of the sample is then directly read in terms of the same cubic centimeter measurements. This construction avoids the necessity for providing accurate measuring scales correlated to other structures such as the mechanical drive elements of the system. Thus, wear of the moving elements of the system has no affect on the accuracy of the measurement made with the apparatus.

In accordance with another embodiment of the present invention, the assembly containing the sample is vibrated for removal of air bubbles and the lower end of the bore through the piston is tapered to provide a conical opening for guiding the removal of air bubbles which would produce an erroneous determination of the sample volume.

In accordance with still another aspect of the present invention, a basket spring biased up out of the liquid when the piston is removed from the cylinder lifts the sample out of the liquid following a volume measurement to cause drainage of fluid from the sample to help avoid the necessity for repeatedly zeroing the apparatus after every measurement of a sample volume.

In accordance with still another aspect of the present invention a colored fluid having a density between approximately 1.05 and 1.18 g/cm$^3$ is provided in the container cylinder and having a surface active agent and an anti-vaporization agent for making repeated accurate volume determinations. The surface active agent provides a wetting affect that avoids entrapped or collected air bubbles on the surface of the sample, and the anti-vaporization agent avoids vaporization of the liquid which could result in inaccurate readings where a measurement is taken over an extended period of time.

In accordance with still another aspect of the present invention a colored cross-linked polystyrene sphere is floated on the surface of the fluid and provides a precise highly contrasting point which can be read on the graduated scale for making the volume measurement. In accordance with this aspect of the invention, the sight tube or a backing scale can be provided with a partially mirrored surface so that in sighting a reading the bead is aligned with its reflection for a level sighting. Contamination of the liquid which might affect the surface tension of the fluid and the shape of the meniscus will not affect the accuracy of the reading taken from the bottom of the sphere.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is an elevational view schematically illustrating the present invention.

FIG. 2 is an enlarged elevational sectional view of a portion of the structure shown in FIG. 1 taken along line 2—2 in the direction of the arrows, but with the piston partially removed from the container cylinder.

FIG. 3 is an enlarged elevational sectional view of another portion of the structure shown in FIG. 1 illustrating the position of the polystyrene bead floating on the surface of the measuring fluid.

FIG. 4 is an enlarged sectional view of another portion of the structure shown in FIG. 1 taken along line 4—4 in the direction of the arrows.

FIG. 5 is an elevational sectional view of the sight tube illustrating another embodiment of the present invention.

FIG. 6 is a schematic elevational view showing the volume determining apparatus being vibrated during the course of making an accurate measurement.

DESCRIPTION OF THE PREFERRED EMBODIMENT

While the present invention is applicable to determination of the volume of irregular objects of various sizes and shapes, it has unique application for the determination of the volume of relatively small irregular objects, such as precious metals, as gold nuggets, gem stones and the like. Accordingly, the preferred embodiment illustrated in the accompanying drawing is particularly designed for such applications.

Referring now to the drawing, with particular reference to FIGS. 1 and 2, there is shown a specific volume determining method and apparatus in accordance with the present invention which includes a hollow cylindrical container cylinder 11 sealably mounted at its lower end on a base plate 12. The cylinder 11 is preferably transparent, such as of transparent plastic, for observation of a sample object therewithin. A passageway 13 is provided through the base plate 12 for communication between the interior or cylinder 11 and a conduit 14 connected to one port of a three-way valve 15 for supplying a loading fluid 16 into the cylinder 11 for making a volume measurement. A syringe 17 is connected to a second port of the three-way valve 15, and the third port 18 can be connected via a filling tube, not shown, to a supply of the loading fluid for filling the container cylinder 11 in the manner to be described in greater detail below.

The base plate 12 is provided with a central recess 21 in which is located the lower end of a coil spring 22. The upper end of the coil spring 22 is mounted on a downwardly extending hollow stem 23 of an apertured basket 24. The length and strength of the spring 22 are selected so that the basket supporting a sample to be measured can be forced down into the bottom of the cylinder during a measuring operation but will lift the basket 24 and the sample out of the solution 16 when the apparatus is opened for unloading.

A slidable sealable piston 31 is provided for sliding insertion into cylinder 11 with one or more 0-rings 32 provided in grooves in the outside cylindrical surface of piston 31 to make sealing contact between the piston 31 and the container cylinder 11. The top of piston 31 is provided with an outwardly extending flange 33, the lower surface 34 of which will come into contact with the upper edge 35 of the cylinder 11 when the piston 31 is moved down into the cylinder 11 to the position where a volume measurement is taken. Piston 31 is provided with an axial bore 36 with the bore wall 37 thereof having an outwardly tapered wall portion 38 at the bottom of the piston 31 forming a conical opening 39 to aid in removal of air bubbles described in greater detail below. The piston is preferably made of transparent plastic in order to detect air bubbles during a sample measurement.

The upper end of the bore 36 is provided with an outwardly stepped diameter portion 41 which opens at the upper surface 42 of the piston 31 for receiving a precision bore glass sight tube 43. A fluid seal is created between the piston 31 and the sight tube 43, such as by O-rings positioned in circumferential grooves in the stepped diameter bore 41. The sight tube 43 is provided with a scale 44 marked off in volume increments along its length. As shown in FIGS. 1 and 2 of the drawing this scale is provided on a plate 45 which is secured to the upper surface 42 of piston 31, such as by screws 46 and is secured to the sight tube 43 by brakcets 47. A vernier scale 48 is provided on a slide 49 which can be moved up and down the plate 45 for increasing the accuracy of readings made on the scale 44.

A pair of cylindrical guide posts 51 are provided on the base plate 12, such as by being screwed thereinto, and are spaced on opposite sides of the container cylinder 11 for guiding the piston 31 up and down into and out of the container cylinder 11 during operation of the volume determining apparatus. The flange 33 is provided with bores 52 through which the posts 51 pass. The guide posts 51 have a series of matching reduced diameter sections 53 which can be used to aid in prying the flange 33 upwardly and downwardly on the posts 51 and with which locking wedges 54, having grooves 55 the width of the reduced diameter section 53, cooperate for locking the piston in its lower closed position as shown in FIG. 1 or elevated open position. In elevated position the piston 31 is totally removed from the cylinder 11 and positioned thereabove for insertion of the sample S to be measured.

A special fluid medium is utilized in the volume determining apparatus to obtain accurate measurements. The medium of the preferred embodiment is colored, such as blue and such as with food coloring, to provide contrast so that included air bubbles can be seen. The medium has a pH of approximately 7.0 to minimize leaching from metal test samples and has a density between approximately 1.05 and 1.18 g/cm$^3$. The density of the fluid should be 1.10 or greater to give maximum differential to air bubbles for rapid and complete elimination of air bubbles and films. The fluid is provided with a surface active agent such as degitol nonionic MPX 0.5% to lower interfacial surface tension between liquid and air for air bubble film elimination. The fluid is typically 15% to 100% glycol to avoid freezing and liquid vaporization and a preferred solution found to give good results is 20% by volume glycol and 80% by volume dionized water. An anti-mold agent, such as 0.1% phenol, is provided in the fluid to prevent mold growth in storage and use.

A miniature sphere or bead 57 which floats on the fluid 16 is provided for taking accurate readings of the surface level of the fluid in the sight tube 43. For use with the medium as described above a sphere having a density of less than 1.05 g/cm$^3$ is preferred. A cross-linked polystyrene sphere dyed black having a diameter in the range of 100 to 1,000 microns, typically 500 microns is preferred.

While a consistent accurate measurement can be made by sighting onto the scale 44 from the bottom of the bead 57, it will be appreciated that the scale can be actually etched onto the sight tube 43' as shown in FIG. 5. Additionally, the sight tube can be provided on one side with at least a partially mirrored reflective surface material 58. With the mirrored surface 58 a sight reading can be made at the bottom of the bead aligning the bead with its reflection to make certain that the reading is taken level with the height of the bead in the column.

For a complete understanding of the operation of the present invention, a detailed description will be given of the manner in which the measuring apparatus is loaded and how measurements are taken. The piston 31 is moved down into the container cylinder 11 until the lower surface 34 of the flange 33 abuts the upper edge 35 of the cylinder 11, and the piston is locked in this position by insertion of wedges 54 in the reduced diameter section 53 immediately above the piston upper surface 42 with pressure until there is no change in column height with added pressure. To initially load the apparatus with the fluid 16, the plunger of syringe 17 is placed in its lowest position and port 18 is connected to a loading tube, the other end of which is immersed in a container of the loading fluid. With the three-way valve connecting port 18 to the syringe 17 the syringe plunger is raised, and fluid is drawn into the syringe 17. The three-way valve is then turned to connect the syringe via conduit 14 to the cylinder 11, and fluid is injected into cylinder 11 to fill the chamber. A bead 57 is dropped into the open top end of sight tube 43 and the syringe advanced so that the fluid rises to the zero level of the scale 44. The assembly is degassed to remove all air bubbles by vibrating the assembly, such as on a vibration table 61 mounted on a vibratory motor assembly 62 which can employ an eccentric drive (see FIG. 6). If the fluid level is still on the zero mark after degassing, the three-way valve is closed to isolate the fluid 16 in the cylinder 11 from the syringe and steps are taken to place the sample in the apparatus.

The lock wedges 54 are removed and the piston 31 is pryed upwardly by pry tools inserted in reduced diameter sections 53 below the lower surface 34 of the flange 33. When the flange 33 has been raised to the top of the guide posts 51 one of the locking wedges 54 is inserted in the highest reduced diameter section 53. Any fluid draining off of the piston will drain into the container 11. The test sample is cleaned carefully and positioned with tweezers on the basket 24. The basket keeps the fluid from splashing and the tweezers from touching the fluid. The lock wedge is removed and the piston 31 lowered into the cylinder 11. Pry tools are used to move the piston smoothly to its lower-most position and the lock wedges 54 inserted as shown in FIG. 1. The entire assembly is positioned on the vibration table 61. Loose bubbles on the sample S and from parts inside the cylinder 11 will be driven up through the sight tube. Additionally, very small dislocations of the piston O-rings 32 will be relieved thereby reducing possible error in the reading. The assembly can be visually checked to insure that there are no bubbles in the chamber. If bubbles are present, the assembly is tilted 45-degrees in one direction and tapped with an instrument to cause the bubbles to collect in one area. The chamber is tilted back 45-degrees in the opposite direction so that all bubbles flow up into the sight tube.

The sample object will displace the loading fluid up into the sight tube in accordance with the volume of the sample object. The lower edge of the bead 57 in the sight tube is read at the appropriate line on the scale. For more precise measurements, the vernier scale zero line is moved to the bottom of the bead 57 and the first vernier line coincident with the larger scale is read. The piston 31 is then unlocked and raised to elevated position. The spring biased basket will lift the sample out of the fluid to drain, and when the sample is removed with tweezers, the tweezers will not contact the fluid.

It will be obvious to those skilled in the art that the method and apparatus of this invention will have wide application.

Other users of the device are described in the copending application of James A. Patterson, Ser. No. 959,673 filed Nov. 13, 1978, entitled "Method for Determining and Grading of Precious Minerals."

I claim:
1. A volume determining apparatus comprising, in combination,
   a container cylinder for holding a fluid and a sample to be measured,
   means providing fluid communication to said container cylinder,
   a piston slidable within said container cylinder and having means for making a seal between the outside surface of said piston and the inside surface of said container cylinder, said piston having an outwardly projecting flange at the top of said piston for engagement with the upper edge of said container cylinder and a bore through said piston extending in the axial direction thereof,
   a precision bore sight tube at least partially transparent mounted on said piston in sealed communication with said bore and with a scale marked off in volume increments along the length of said sight tube,
   said bore tapered outwardly toward the bottom of said piston to form a conical opening in the bottom of said piston,
   means for locking said piston in place in said cylinder with the lower surface of said flange locked against said upper edge of said container cylinder,
   said locking means including at least a pair of guideposts fixedly secured relative to said cylinder and projecting above said cylinder and provided with matching reduced diameter sections located immediately above the upper surface of said piston flange when said piston is seated within said container cylinder with the lower surface of said flange engaging said upper edge of said cylinder, and
   locking means engageable in said reduced diameter sections of said guideposts for wedging said lower surface of said flange against said upper edge of said container cylinder.
2. The apparatus of claim 1 including
   a perforated basket movable within said container cylinder, and spring means for mounting said basket within said cylinder for lifting said basket out of the fluid contained within said cylinder when said piston is removed from said cylinder.

3. The apparatus of claim 1 including a colored fluid filling said container cylinder up to a predetermined mark on said scale when said piston is locked in place in said container cylinder and having a density between approximately 1.05 and 1.18 grams per cubic centimer and containing a surface active agent and an anti-vaporization agent.

4. The apparatus of claim 3 including a miniature cross-linked polystyrene sphere floating on the surface of said liquid.

5. A volume determining apparatus comprising, in combination, a base plate, a container cylinder mounted on said base plate for holding a fluid and a sample to be measured, means providing fluid communication to said container cylinder including a three-way valve connected to said conduit, a syringe connected to said three-way valve for filling and zeroing said apparatus, a piston slidable within said container cylinder and having means for making a seal between the outside surface of said piston and the inside surface of said container cylinder, said piston having an outwardly projecting flange at the top of said piston for engagement with the upper edge of said container cylinder, a bore through said piston extending in the axial direction thereof, said bore tapered outwardly toward the bottom of said piston to form a conical opening in the bottom of said piston, and an outwardly stepped diameter bore at the top of said piston, a precision bore sight tube, at least partially transparent, sealably mounted in said outwardly stepped diameter bore of said piston and with a scale marked off in volume increments along the length of said sight tube, at least a pair of guideposts projecting upwardly from said base plate and provided with matching reduced diameter sections located immediately above the upper surface of said piston flange when said piston is seated within said container cylinder with the lower surface of said flange engaging said upper edge of said cylinder, and locking means engageable in said reduced diameter sections of said guideposts for wedging said lower surface of said flange against said upper edge of said container cylinder.

6. The apparatus of claim 5 including
a perforated basket movable within said container cylinder, and
spring means for mounting said basket within said cylinder for lifting said basket out of the fluid contained within said cylinder when said piston is removed from said cylinder.

7. The apparatus of claim 5 including a colored fluid filling said container cylinder up to a predetermined mark on said scale when said piston is locked in place in said container cylinder and having a density between approximately 1.05 and 1.18 grams per cubic centimeter and containing a surface active agent and an anti-vaporization agent.

8. The apparatus of claim 7 including a miniature cross-linked polystyrene sphere floating on the surface of said liquid.

9. The method of measuring the volume of an article comprising the steps of establishing a reopenable fluid tight fixed volume of two telescoped members when locked together define a fixed volume with an overflow into a precision graduated fluid container, filling the closed fixed volume with a fluid to a predetermined graduation of said container thereby establishing a precise volume of fluid.

telescopically moving said members from locked position for opening the fixed volume without removing any fluid, placing the article to be measured in said fluid, telescopically moving said members for closing the fixed volume to locked position with the article therewithin, locking said two telescoped members and confining said precise volume of fluid and the article to said fixed volume, a volume of said graduated fluid container to said predetermined graduation, and an additional volume of said graduated fluid container beyond said predetermined graduation, vibrating the volume and fluid to separate any gas bubbles from the article, funneling said separated gas bubbles upwardly along an inclined tapered wall to move any gas bubbles into said graduated container, and establishing the level of the fluid in said graduated container whereby the difference between the last established level of fluid in said container and said predetermined graduation is a measure of the volume of the article.

10. The method of claim 9 including the step of floating a miniature sphere on the surface of the fluid in said graduated container for accurately sighting the level of the fluid therein.

* * * * *